(12) United States Patent
Cho et al.

(10) Patent No.: US 10,340,518 B2
(45) Date of Patent: Jul. 2, 2019

(54) ANODE ACTIVE MATERIAL FOR LITHIUM SECONDARY BATTERY, PREPARATION METHOD THEREFOR, AND LITHIUM SECONDARY BATTERY CONTAINING SAME

(71) Applicant: UNIST(ULSAN NATIONAL INSTITUTE OF SCIENCE AND TECHNOLOGY), Ulsan (KR)

(72) Inventors: Jaephil Cho, Ulsan (KR); Min Seong Ko, Ulsan (KR); Su Jong Chae, Ulsan (KR); Ji Young Ma, Ulsan (KR); Nam Hyung Kim, Ulsan (KR)

(73) Assignee: UNIST(ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 5 days.

(21) Appl. No.: 15/737,040

(22) PCT Filed: Jun. 15, 2016

(86) PCT No.: PCT/KR2016/006357
§ 371 (c)(1),
(2) Date: Dec. 15, 2017

(87) PCT Pub. No.: WO2016/204512
PCT Pub. Date: Dec. 22, 2016

(65) Prior Publication Data
US 2018/0337400 A1 Nov. 22, 2018

(30) Foreign Application Priority Data

Jun. 15, 2015 (KR) ........................ 10-2015-0084157

(51) Int. Cl.
*H01M 4/36* (2006.01)
*H01M 10/0525* (2010.01)
(Continued)

(52) U.S. Cl.
CPC ............ *H01M 4/366* (2013.01); *C01B 33/029* (2013.01); *H01M 4/364* (2013.01); *H01M 4/386* (2013.01);
(Continued)

(58) Field of Classification Search
CPC ...... H01M 4/366; H01M 4/625; H01M 4/364; H01M 4/386; H01M 10/0525; H01M 4/587; H01M 10/052
See application file for complete search history.

(56) References Cited

U.S. PATENT DOCUMENTS 6,589,696 B2 * 7/2003 Matsubara .............. H01M 2/32
429/218.1
6,733,922 B2 * 5/2004 Matsubara ............ H01M 4/362
252/182.1
(Continued)

FOREIGN PATENT DOCUMENTS

JP         2007234585       9/2007
KR    10-2001-0054903 A    7/2001
(Continued)

OTHER PUBLICATIONS

Ding et al., "Characteristics of Graphite Anode Modified by CVD Carbon Coating," *Surface and Coatings Technology*, 200: 3041-3048, 2006.
(Continued)

*Primary Examiner* — Stewart A Fraser
(74) *Attorney, Agent, or Firm* — Klarquist Sparkman, LLP (57) ABSTRACT

An anode active material for a lithium secondary battery, a preparation method thereof, and a lithium secondary battery including the anode active material are provided. The anode active material includes carbon particles having a spherical shape, a first carbon coating layer present on surfaces of the
(Continued)

carbon particles, a silicon coating layer present on the first carbon coating layer and including silicon nanoparticles, and a second carbon coating layer present on the silicon coating layer.

21 Claims, 9 Drawing Sheets

(51) Int. Cl.
    *H01M 4/587*     (2010.01)
    *H01M 10/052*     (2010.01)
    *H01M 4/38*     (2006.01)
    *H01M 4/62*     (2006.01)
    *C01B 33/029*     (2006.01)
    *H01M 4/02*     (2006.01)

(52) U.S. Cl.
    CPC ........... *H01M 4/587* (2013.01); *H01M 4/625* (2013.01); *H01M 10/052* (2013.01); *H01M 10/0525* (2013.01); *H01M 2004/027* (2013.01)

(56) References Cited

U.S. PATENT DOCUMENTS

| | | | |
|---|---|---|---|
| 7,618,678 B2 * | 11/2009 | Mao | C25D 17/10 427/212 |
| 8,029,931 B2 | 10/2011 | Im et al. | |
| 8,329,136 B2 | 12/2012 | Umeno et al. | |
| 8,673,502 B2 | 3/2014 | Petrat et al. | |
| 9,419,281 B2 | 8/2016 | Han et al. | |
| 9,711,787 B2 | 7/2017 | Yoo et al. | |
| 2015/0132655 A1 | 5/2015 | Yuge et al. | |
| 2015/0303460 A1 | 10/2015 | Murata et al. | |

FOREIGN PATENT DOCUMENTS

| | | |
|---|---|---|
| KR | 10-2006-0069738 A | 6/2006 |
| KR | 10-0738054 B1 | 6/2006 |
| KR | 10-2007-0111521 | 11/2007 |
| KR | 10-1075028 | 10/2011 |
| KR | 10-1281186 B1 | 6/2013 |
| KR | 10-2014-0070416 A | 6/2014 |
| WO | WO2014/080629 | 5/2014 |

OTHER PUBLICATIONS

Korean Intellectual Property Office, Office Action, dated Oct. 30, 2017, issued in Korean Application No. 10-2016-0074481.
Extended Search Report for European Application No. 16811925,3, dated Mar. 13, 2019.
Office Action for Japanese Application No. 2017-565264, dated Jan. 4, 2019 (with a machine/Google Translate English-language translation of the Japanese Office Action as well).

\* cited by examiner

ANODE ACTIVE MATERIAL FOR LITHIUM SECONDARY BATTERY, PREPARATION METHOD THEREFOR, AND LITHIUM SECONDARY BATTERY CONTAINING SAME

TECHNICAL FIELD

The present disclosure relates to an anode active material for a lithium secondary battery, a preparation method thereof, and a lithium secondary battery including the anode active material.

BACKGROUND ART

A lithium secondary battery, which is charged and discharged through oxidation/reduction of lithium ions, includes a cathode, an anode, an ion exchange membrane between the cathode and the anode, and an electrolyte.

For systems that require large-capacity batteries, such as electric vehicles, there is a need to increase capacity of an anode active material used in such a lithium secondary battery and increase output characteristics and lifetime characteristics of the lithium secondary battery. To this end, there is a need for development of a stable alloy-based anode material having a high capacity, instead of conventional carbonaceous anode materials.

A conventional carbonaceous anode active material has merely a theoretical capacity of about 372 mAh/g, and significantly reduced output characteristics, particularly in a high-rate charging condition, due to a mechanism of intercalation and deintercalation of lithium ions in a carbon interlayer during charging and discharging.

An alloy-based material that is currently under research also has fairly low electrical conductivity and may undergo considerable volume expansions during charging and discharging, leading to severe damage of electrode plates and a sharp reduction in capacity. Therefore, there are difficulties in commercializing the alloy-based material.

DETAILED DESCRIPTION OF THE INVENTION

Technical Problem

The present invention provides an anode active material for a lithium secondary battery, having greater capacity than conventional commercialized carbonaceous anode active materials and improved lifetime and output characteristics, and a method of preparing the anode active material.

Technical Solution

According to an aspect of the present invention, an anode active material for a lithium secondary battery includes: carbon particles having a spherical shape; a first carbon coating layer present on surfaces of the carbon particles; a silicon coating layer present on the first carbon coating layer and including silicon nanoparticles; and a second carbon coating layer present on the silicon coating layer.

The carbon particles having the first carbon coating layer thereon may have an 10% or greater increased Brunauer-Emmett-Teller (BET) specific surface area with respect to a BET specific surface area of the carbon particles having the spherical shape.

The carbon particles having the first carbon coating layer thereon may have an 10% or greater reduced Brunauer-Emmett-Teller (BET) specific surface area with respect to a BET specific surface area of the carbon particles having the spherical shape.

The silicon nanoparticles may be semicrystalline.

The first carbon coating layer may partially include a mixed layer of silicon and carbon.

The mixed layer of silicon and carbon may have a concentration gradient in which an amount of silicon decreases in the direction of a core.

The silicon coating layer present on the first carbon coating layer may be in a mixed form of a film and an island.

A content ratio of silicon to carbon may be about 3:97 to about 20:80, with respect to a total weight of the anode active material.

The anode active material may include 2 wt % to 6 wt % of the first carbon coating layer, 4 wt % to 20 wt % of the silicon coating layer, and 1.5 wt % to 10 wt % of the second carbon coating layer, each based on a total of 100 wt % of the anode active material, and the remainder may be the carbon particles.

The carbon particles may include graphite, amorphous carbon, or a combination thereof.

The carbon particles may have a particle diameter of 5 μm to 20 μm.

The first carbon coating layer may have a thickness of 5 nm to 200 nm.

The silicon coating layer may have a thickness of 20 nm to 60 nm.

The second carbon coating layer may have a thickness of 5 nm to 200 nm.

According to an aspect of the present invention, a method of preparing an anode active material for a lithium secondary battery includes: preparing carbon particles having a spherical shape; forming a first carbon coating layer on surfaces of the carbon particles; forming, on the first carbon coating layer, a silicon coating layer including silicon nanoparticles; and forming a second carbon coating layer on the silicon coating layer.

The forming of the first carbon coating layer on the surfaces of the carbon particles may be performed using a sol-gel method.

The forming of the first carbon coating layer on the surfaces of the carbon particles may be performed using a chemical vapor deposition method.

In the forming of the silicon coating layer including silicon nanoparticles on the first carbon coating layer, the silicon nanoparticles may be amorphous. In the forming of the silicon coating layer including silicon nanoparticles on the first carbon coating layer, the silicon coating layer may be deposited in a mixed form of a film and an island.

In the forming of the silicon coating layer including silicon nanoparticles on the first carbon coating layer, a silicon-based precursor, for example, silane ($SiH_4$), dichlorosilane ($SiH_2Cl_2$), silicon tetrafluoride ($SiF_4$), silicon tetrachloride ($SiCl_4$), methylsilane ($CH_3SiH_3$), disilane ($Si_2H_6$), or a combination thereof may be used.

The forming of the second carbon coating layer on the silicon coating layer may be performed using a physical milling method, a sol-gel method, or a chemical vapor deposition method.

When the forming of the second carbon coating layer on the silicon coating layer is performed using a chemical vapor deposition method, a carbon precursor selected from the group consisting of a rayon-based carbon precursor, a PAN-based carbon precursor, a pitch-based carbon precursor, and a combination thereof may be used.

According to an aspect of the present invention, a lithium secondary battery includes: a cathode; an anode; and an electrolyte, wherein the anode include the anode active material according to any of the embodiments.

Advantageous Effects of the Invention

As described above, according to the one or more embodiments, an anode active material for a lithium secondary battery, having improved lifetime characteristics and output characteristics, and a method of preparing the anode active material may be obtained.

MODE OF THE INVENTION

Hereinafter, embodiments of the present disclose will be described in greater detail. In this regard, embodiments described herein should be considered in a descriptive sense only and not for purposes of limitation. The present embodiments may have different forms and should not be construed as being limited to the descriptions set forth herein.

According to an aspect of the present disclosure, there is provided an anode active material for a lithium secondary battery, including: carbon particles having a spherical shape; a first carbon coating layer present on surfaces of the carbon particles; a silicon coating layer present on the first carbon coating layer and including silicon nanoparticles; and a second carbon coating layer present on the silicon coating layer.

In some embodiments, the carbon particles having the first carbon coating layer thereon have an about 10% or greater increased or reduced Brunauer-Emmett-Teller (BET) specific surface area with respect to a BET specific surface area of the carbon particles not having the first carbon coating layer thereon.

The anode active material according to one or more embodiments may have a carbon/silicon composite structure. When this carbon/silicon composite is formed from a blended slurry prepared using heterogeneous materials including a carbonaceous anode material and amorphous silicon powder, problems such as phase separation and dispersion may be resolved.

A considerably increased specific surface area of the spherical carbon particles (for example, graphite), due to the first carbon coating layer, may be made the best use of. The carbon/silicon composite may be implemented by depositing and/or coating silicon inside or over pores in the first carbon coating layer through chemical vapor deposition and then forming the second carbon coating layer thereon.

In some embodiments, in forming the first carbon coating layer on the spherical carbon particles, a sol-gel method may be used to obtain a structure having further increased Brunauer-Emmett-Teller (BET) specific surface area and porosity.

In some other embodiments, in forming the first carbon coating layer on the carbon particles having the spherical shape, a chemical vapor deposition method may be used to obtain a structure having further decreased BET specific surface area and porosity.

The method of forming the first carbon coating layer may be appropriately selected according to desired characteristics of the anode active material.

By previously being coated inside and on surfaces of the spherical carbon particles, carbon particles may serve as a support layer for silicon particles that are to be deposited thereon, improving electrical conductivity and preventing inner sites of the spherical carbon particles from unnecessarily being coated with silicon, so as to mitigate volume expansion of a battery during charging and discharging.

The carbon particles having the first carbon coating layer thereon may have, for example, a BET surface area of 2 $m^2/g$ to 50 $m^2/g$, and in some embodiments, 2 $m^2/g$ to 7 $m^2/g$, and in some other embodiments, 8 $m^2/g$ to 50 $m^2/g$. However, embodiments are not limited thereto, and the BET surface area of the carbon particles may be varied within these ranges.

Accordingly, the carbon/silicon composite may be implemented to have a structure facilitating diffusion of lithium ions into the anode active material and at the same time providing high capacity.

The second carbon coating layer as an outermost layer may provide electron transfer paths between or inside particles in manufacturing an electrode plate and thus to improve conductivity, and may control volume change of silicon during charging and discharging, thus improving stability of the electrode plate.

The carbon/silicon composite as described above may have higher capacity, relative to a conventionally commercialized carbonaceous anode material, and improved lifetime and output characteristics.

Hereinafter, an anode active material for a lithium secondary battery, having the carbon/silicon composite structure as described above, will be described in greater detail.

First, the silicon nanoparticles may be amorphous. The amorphous silicon nanoparticles may have a large capacity per weight of the particles, significantly reduced stress from volume expansion during charging (i.e., alloying with lithium), compared to crystalline silicon nanoparticles, and fast speeds of alloying and dealloying with lithium, which is advantageous in terms of charging and discharging rates.

The silicon coating layer on the first carbon coating layer may be in a form of a film, an island, or a mixed form thereof. As will be described later, the silicon coating layer may be formed, by a chemical vapor deposition method, on the first carbon coating layer in a form of a film, an island, or a combination thereof, using an appropriate silicon-based precursor.

For example, when using the chemical vapor deposition method, the silicon coating layer may be formed in the form of an island at the beginning. The island form is an appropriate form to cope with volume expansion of the silicon nanoparticles included in the silicon coating layer.

As the deposition amount is increased, the silicon coating layer may be formed as a film and then finally as a mixed form of an island and a film at the end of the deposition. This may lead to an improved capacity per weight of the silicon particles and improved coulombic efficiency.

Unlike this, when a physical deposition method such as ball milling is used, the silicon nanoparticles may be simply adhered onto the first carbon coating layer by a strong physical force while source materials are mixed. In this case, it is nearly impossible to make the silicon nanoparticles adhere while uniformly controlling a degree of distribution. Furthermore, since the source materials are mixed and ground at the same time, the carbon material may be damaged, causing performance degradation when used in a battery.

A content ratio of silicon to carbon may be 3:97 to 20:80, with respect to a total weight of the anode active material. When the content ratio of silicon to carbon satisfies this range, the anode active material may exhibit a high capacity of 400 mAh/g to 800 mAh/g.

In some embodiments, the anode active material may include 2 wt % to 6 wt % of the first carbon coating layer, 4 wt % to 20 wt % of the silicon coating layer, 1.5 wt % to 10 wt % of the second carbon coating layer, each based on a total of 100 wt % of the anode active material, and the remainder may be carbon particles. When each element of the anode active material satisfies these ranges, the elements of the anode active material may exhibit the above-described effect.

When each of the elements satisfies the above ranges, a particles diameter of the carbon particles, a thickness of the first carbon coating layer, a thickness of the silicon coating layer, and a thickness of the second carbon coating layer may satisfy the following ranges.

The carbon particles may have a particle diameter of 5 μm to 20 μm.

The first carbon coating layer may have a thickness of 5 nm to 200 nm.

The silicon coating layer may have a thickness of 20 nm to 60 nm.

The second carbon coating layer may have a thickness of 5 nm to 200 nm.

Since the silicon coating layer is located between the first carbon coating layer and the second carbon coating layer, volume expansion and side reactions of the silicon coating layer may be controlled by varying the amounts and thicknesses of the first carbon coating layer within the above limited ranges.

Furthermore, by varying the amount and thickness of the silicon coating layer within the above limited ranges, capacity of the anode active material exhibited by the silicon coating layer may be controlled. In particular, as the amount and thickness of the silicon coating layer are increased, the anode active material may have improved capacity.

In some embodiments, the first carbon coating layer may provide an increased specific surface area to carbon particles when coated thereon, compared to the other spherical carbon particles not coated by the first carbon coating layer. This increased specific surface area may provide sites for deposition and/or coating of a larger amount of silicon, and may also serve as a support (i.e., implant) stably fixing the deposited and/or coated silicon. This is due to, as described above, that silicon may be deposited/or coated inside or over pores in the first carbon coating layer.

In some embodiments, when a sol-gel method is used, as a result of measuring BET specific surface areas before and after the formation of the first coating layer, the carbon particles after the formation of the first coating layer were found to have a considerably increased BET specific surface area, compared to graphite particles without any coatings thereon (i.e., before formation of the first coating layer). This increase in BET specific surface area may mean increased porosity In some other embodiments, when a chemical vapor deposition method is used, the BET specific surface area may be decreased after the formation of the first carbon coating layer. In a certain case, using the chemical vapor deposition method may exhibit improved battery characteristics. This is attributed to unnecessary micropores of spherical graphite being clogged in advance, which leads to silicon using sufficiently large pores as void spaces and coating only the large pores and a surface of the graphite.

That is, the first carbon coating layer may reduce the BET specific surface area of graphite by blocking unnecessary pores in the graphite, and may serve as a conduction path and buffer of silicon by being coated on the surface of the graphite.

The first carbon coating layer may be uniformly coated on the surfaces of the carbon particles. The second carbon coating layer may also be uniformly coated on a surface of the silicon coating layer. The expression "uniformly coated" used herein may refer to the surfaces of the carbon particles and the silicon coating layer being densely coated so as not to be exposed.

The carbon particles may include graphite, amorphous carbon, or a combination thereof. For example, the carbon particles may be graphite. Independent of this, the first carbon coating layer and the outermost second carbon coating layer may include amorphous carbon.

According to another aspect of the present disclosure, there is provided a method of preparing an anode active material for a lithium secondary battery, the method including: preparing carbon particles having a spherical shape; forming a first carbon coating layer on surfaces of the carbon particles; forming, on the first carbon coating layer, a silicon coating layer including silicon nanoparticles; and forming a second carbon coating layer on the silicon coating layer.

Through this method, a carbon/silicon composite having a capacity of 400 mAh/g to 800 mAh/g may be synthesized. This carbon/silicon composite may have the same characteristics (for example, composition, thickness, etc.) as that described above in connection with the embodiments of the anode active material.

Hereinafter, each step of the method will be described in greater detail, and the overlapping description of the carbon/silicon composite will be omitted.

Figure 1:
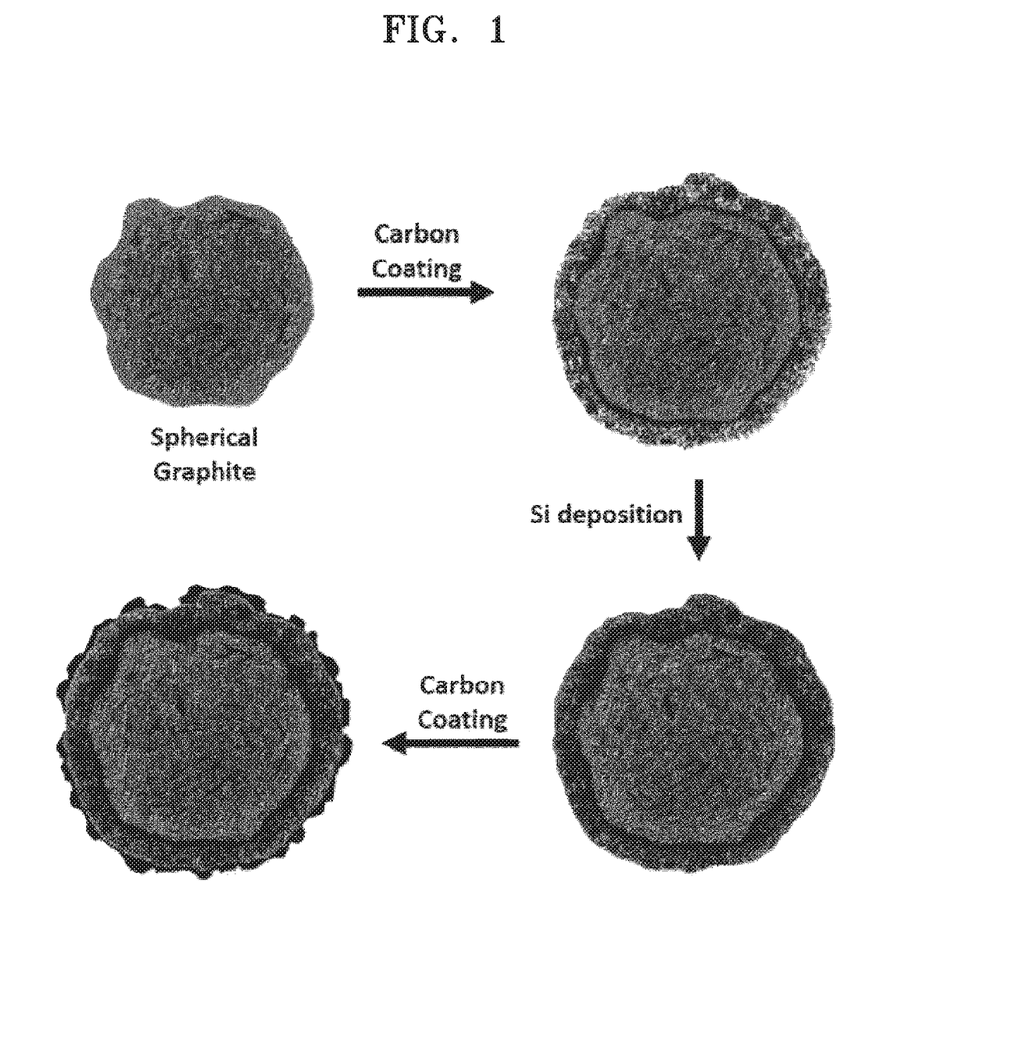
FIG. 1 is a flow diagram of a method of preparing an anode active material according to an embodiment.

FIG. 1 is a flow diagram of a method of preparing an anode active material, according to an embodiment.

Through the forming of the first coating layer on the surfaces of the carbon particles, the carbon particles coated by the first coating layer may be provided with an increased or decreased BET specific surface area, compared to the other spherical carbon particles not coated by the first coating layer. Required battery characteristics may be controlled according to such an increased or reduced specific surface area of the carbon particles. This has been sufficiently described above, and thus a detailed description thereof will be omitted.

In some embodiments, the forming of the first coating layer on the surfaces of the carbon particles may be performed using a sol-gel method or a chemical vapor deposition method.

The forming of the silicon coating layer including silicon nanoparticles on the first carbon coating layer may be performed using a chemical vapor deposition method.

In this case, in a deposition step of the silicon coating layer, a silicon-based precursor, for example, silane ($SiH_4$), dichlorosilane ($SiH_2Cl_2$), silicon tetrafluoride ($SiF_4$), silicon tetrachloride ($SiCl_4$), methylsilane ($CH_3SiH_3$), disilane ($Si_2H_6$), or a combination thereof may be used. These silicon-based precursors may be in a liquid or vapor state.

For example, after being vaporized, the silicon-based precursor in a liquid or vapor state may be mixed with a gas such as hydrogen ($H_2$), argon (Ar), or nitrogen ($N_2$), and then used in chemical vapor deposition.

When such a chemical vapor deposition method is used, the silicon nanoparticles in the silicon coating layer may be amorphous, and the silicon coating layer may be deposited in a mixed form of a film and an island. Accordingly, capacity per unit weight of silicon and coulombic efficiency may be improved.

The forming of the second carbon coating layer on the silicon coating layer may be performed using a sol-gel method or a chemical vapor deposition method. For example, when a carbon precursor selected from the group consisting of a rayon-based carbon precursor, a PAN-based carbon precursor, a pitch-based carbon precursor, and a combination thereof and a carbon vapor deposition method are used, the second carbon coating layer may be uniformly coated on a surface of the silicon coating layer as described above.

One or more embodiments of the present disclosure will now be described in detail with reference to the following examples. However, these examples are only for illustrative purposes and are not intended to limit the scope of the one or more embodiments of the present disclosure.

EXAMPLES (Preparation of Anode Active Material)

Comparative Example 1: Bare Graphite Core

Uncoated graphite (bare graphite) was used as an anode active material.

Comparative Example 2: Graphite Core+Si+C Structure

An anode active material including a silicon coating layer on graphite was prepared by chemical vapor deposition at a temperature of 550° C. from 50 g of the graphite of Comparative Example 1 and $SiH_4$ (gas) at a rate of 50 sccm for 60 minutes. Then, through pyrolysis of $C_2H_2$ (gas) at a rate of about 1.5 L/min at a temperature of 900° C., a carbon layer was coated on the silicon coating layer of the anode active material. The obtained anode active material included 95 wt % of graphite, 4 wt % of silicon, and 1 wt % of carbon contained in the outermost carbon layer, based on a total weight of the anode active material.

Example: Graphite Core+First C+Si+Second C Structure

Carbon coating was performed on the anode active material of Comparative Example 1 by using a chemical vapor deposition method or a sol-gel method. In the chemical vapor deposition method, 50 g of the spherical graphite was heated under an inter gas atmosphere ($N^2$) from room temperature to 900° C. at a rate of 5° C./min. When the temperature reached 900° C., then ethylene gas was flowed at 1.5L/min for 30 minutes, thereby forming a first carbon coating layer on the spherical graphite. The spherical graphite including the first carbon coating layer had a decreased BET specific surface area of 3.3 $m^2/g$.

In the sol-gel method, sucrose was used as a carbon precursor. 5 g of sucrose was dissolved in a 9:1 mixed solvent of water and ethanol. When sucrose is subjected to carbonization under a high-temperature inert atmosphere, only 30% of a total added amount of sucrose remains as carbon. Accordingly, to obtain only 3wt % of carbon based on a total weight of graphite and carbon, 5 g of sucrose with respect to 50 g of graphite was sufficient. In this experiment, after sucrose was sufficiently dissolved in the mixed solvent of water and ethanol, 50 g of graphite was added while continuously string to evaporate only the solution at nearly 100° C. The thus-obtained solid was loaded into a furnace under an inert atmosphere, and then subjected to carbonization at 900° C. for 10 minutes. 99% or greater of the obtained powder was filtered through a micro sieve. As a result of scanning electron microscopy (SEM) or transmission electron microscopy (TEM) on cross-sections of the powder, the surface and inside of the graphite was found as being coated with carbon.

Experiments were carried out using a range of amounts of carbon as follows.

Next, chemical vapor deposition from $SiH_4$ (gas) at a rate of about at 50sccm for 60 min was performed to form a silicon coating layer on the graphite.

Through pyrolysis of $C_2H_2$ (gas) at a rate of 1.5 L/min at a temperature of 900° C., an anode active material having a carbon layer coated on the silicon coating layer was prepared.

The obtained anode active material was found to include 86.5 wt % of graphite, 2 wt % to 3 wt % of the first carbon coating layer, 8.5 wt % of silicon, and 2 wt % to 3 wt % of the outermost carbon coating layer, based on a total weight of the anode active material.

(Manufacture of Anode Plate)

The prepared anode active material, a conducting agent, and a binder were used in a ratio of 95.8:1:3.2 to prepare a slurry. The conducting agent used was Super-P. As the binder, a mixture of styrene butadiene rubber (SBR) and sodium carboxymethyl cellulose (CMC) in a weight ratio of 1.5:1.7 was used.

The slurry was uniformly coated on a copper foil, dried in a 80° C. oven for 2 hours, roll-pressed, and then further dried in a 110° C. vacuum oven for 12 hours to manufacture an anode plate.

(Manufacture of Half Cell)

A CR2016 coin-type half cell was manufactured using the above-manufactured anode plate, a lithium coil as a counter electrode, a porous polyethylene membrane as a separator, and a liquid electrolyte containing 1.0M $LiPF_6$ dissolved in a 7:3 (by volume) mixed solvent of diethyl carbonate (DEC) and fluoroethylene carbonate (FEC) according to a commonly known manufacturing process.

EXPERIMENTAL EXAMPLES

Experimental Example 1: Evaluation of Specific Surface Area and Porosity of Carbon Particles with Respect to Formation of First Carbon Coating Layer Specific surface areas and porosities of the bare graphite of Comparative Example 1 and particles having first carbon coating layers (prepared in the above-described Example) before the silicon deposition were measured. The results are shown in Table 1.

TABLE 1

| Graphite | Data | | |
|---|---|---|---|
| coated Carbon by citric acid | Specific Capa. (mAh/g) | ICE (%) | BET (m²/g) |
| Graphite | 365 | 91.4 | 5.28 |
| Carbon coating 0.75 wt % (vs Graphite) | 373 | 90.4 | 8.99 |
| Carbon coating 1.5 wt % (vs Graphite) | 375 | 89.7 | 12.93 |
| Carbon coating 3 wt % (vs Graphite) | 372 | 87.7 | 16.85 |
| Carbon coating 4.5 wt % (vs Graphite) | 370 | 83.8 | 34.61 |
| Carbon coating 6 wt % (vs Graphite) | 370 | 82.2 | 42.36 |

Referring to Table 1, it was found that when carbon coating was performed using the sol-gel method, the specific surface areas of the particles were increased.

Table 2 shows data of the particles according to the above-described Example when the chemical vapor deposition method was used.

TABLE 2

| | Data of Example | | | |
|---|---|---|---|---|
| | 0 min | 30 min | 1 hr | 2 hr |
| BET (m²/g) | 5.28 | 3.2298 | 3.0182 | 2.3395 |
| Pore volume (cm³/g) | 0.022 | 0.014338 | 0.012451 | 0.008448 |

That is, Table 2 shows changes in BET when the first carbon coating layer was formed on the graphite by using chemical vapor deposition, not the sol-gel method.

Referring to Tables 1 and 2, the bare graphite had a BET specific surface area of 5.28 m²/g, while the particles had increased BET specific surface areas merely after the coating of the first carbon coating layers. It was also found that when the chemical vapor deposition method was used, the BET specific surface areas of the particles were decreased to the specific surface area of the graphite, as shown in Table 2.

Experimental Example 2: Analysis of Anode Active Material

Figure 2:
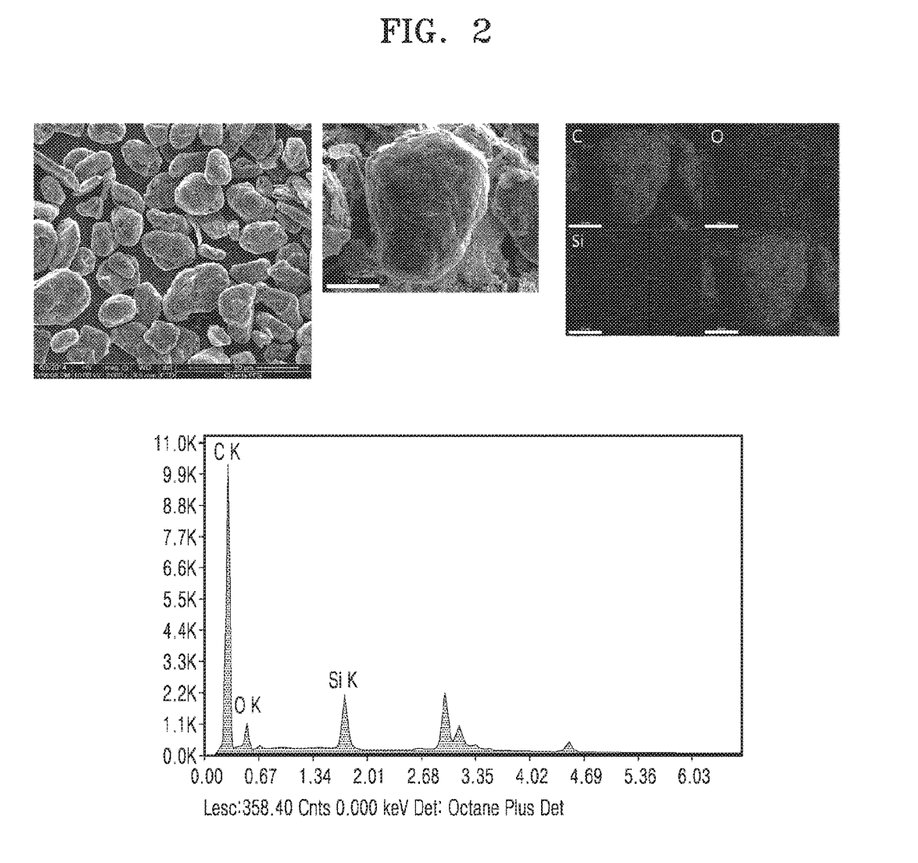
FIG. 2 shows evaluation data of anode active materials according to Example.

FIG. 2 shows analysis data of the anode active materials of Example.

In FIG. 2, the upper left image is a scanning electron microscope (SEM) image at a low magnification of spherical graphite as mother material, the upper middle image is a SEM image at a high magnification of a particle after all the treatments (G+C+Si+C) according to Example, and the upper right image is an EDS mapping image of the upper middle image.

In the EDS mapping image, quadrant 1 (upper right) is an image showing the presence of oxygen, quadrant 2 (upper left) is an image showing the presence of carbon, quadrant 3 (lower left) is an image showing the presence of Si, and quadrant 4 (lower right) is an image showing all the three elements. From these images, it was found that Si was under the second carbon coating.

A graph in the lower middle of FIG. 2 shows the intensities of the elements obtained from the EDS mapping.

Figure 3:
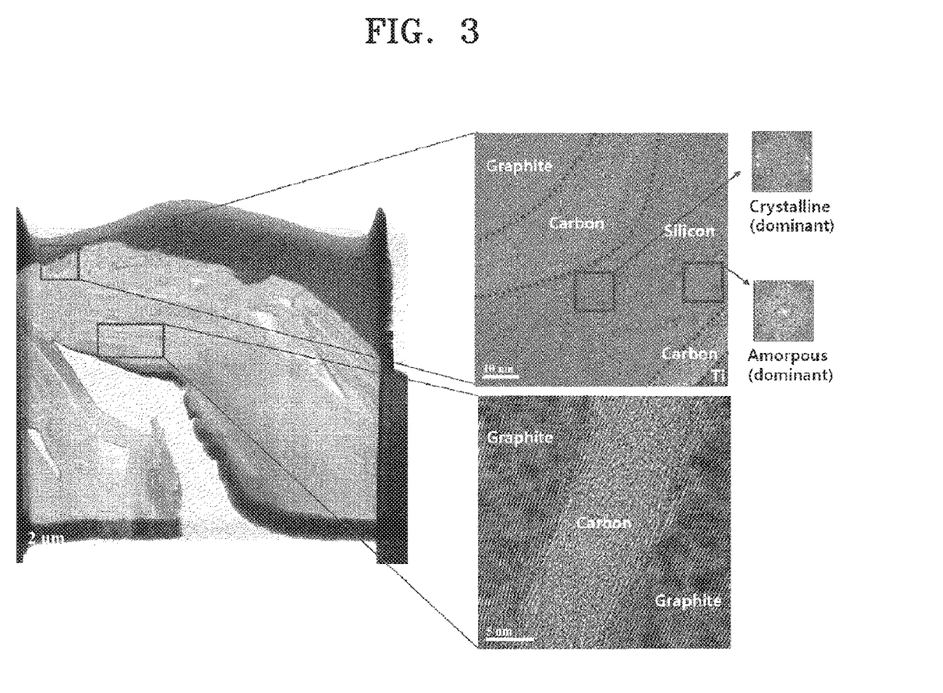
FIG. 3 shows transmission electron microscope (TEM) images of a particle according to Example.

FIG. 3 shows transmission electron microscope (TEM) images of the particles obtained according to Example. In particular, FIG. 3 shows high-magnification TEM images of cross-section samples of the final spherical particles prepared by cutting using focused ion beams (FIBs).

In FIG. 3, the left image is a SEM image showing sampling for TEM from the final spherical graphite (G+C+Si+C) by using FIBs. When the surface and inside of the final spherical graphite were observed using TEM, it was found that the final spherical graphite included the graphite layer, the first carbon coating layer on the graphite layer, the Si coating layer on the first carbon coating layer (a mixed structure of crystalline and amorphous forms), and the second carbon coating layer as the outermost layer, as shown in the upper right images.

A titanium (Ti) coating layer on the second carbon coating layer, as a protection layer which is usually formed to protect the surface of a sample from strong FIBs used to cut the sample, is irrelevant to the examples of the present disclosure.

As shown in FIG. 3, it was found that the first carbon coating layer was coated on the spherical graphite surface and at the same time partially inside the spherical graphite, and silicon was deposited thereon. As shown in the lower right image of FIG. 3, small pores in the graphite were also filled by the first carbon coating layer. In this case, silicon was deposited on the surface and inside of the graphite, except for the pore region, indicating that a partial presence of a concentration gradient layer of silicon and carbon.

Figure 4:
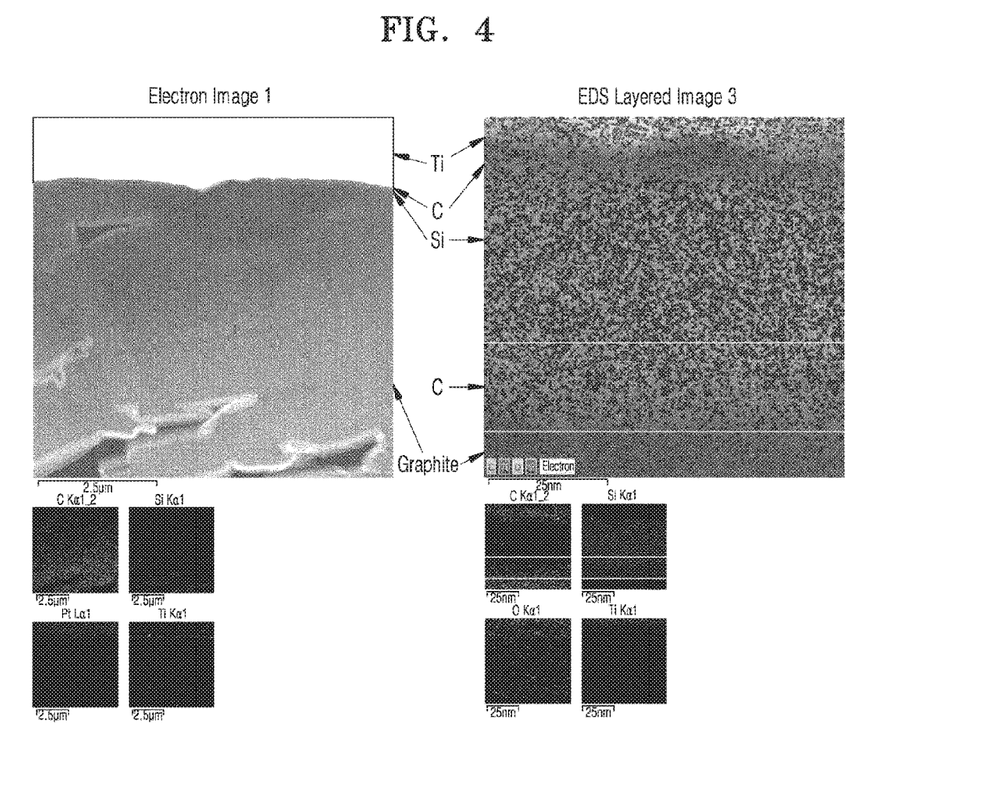
FIG. 4 shows high-magnification TEM images and energy dispersive spectroscopy (EDS) results.

FIG. 4 shows high-magnification TEM images and EDS results.

As shown in the upper left image, it is clear that there was a high contrast (light and shade difference) between carbon and silicon. The dark color (dark gray or gray) indicates carbon, and the light color (near white) indicates silicon.

In summary, the upper right, high-magnification TEM image shows that silicon was coated on both the surface and inside of the graphite, but not in the inner pores of the graphite (regions with slash lines in the TEM image), as being filled with the first carbon coating layer.

Referring to the upper right image as results of the EDS Mapping, the second carbon coating layer (green) appears under the Ti protection layer (pink). The Si layer under the second carbon coating layer, and the mixed layer of Si and C (yellow fluorescent regions) also appear.

The mixed layer of Si and C is due to the first carbon coating layer serving as a support layer of silicon deposited thereon. The presence of carbon (C) from graphite appears under the mixed layer of SI and C.

Figure 5:
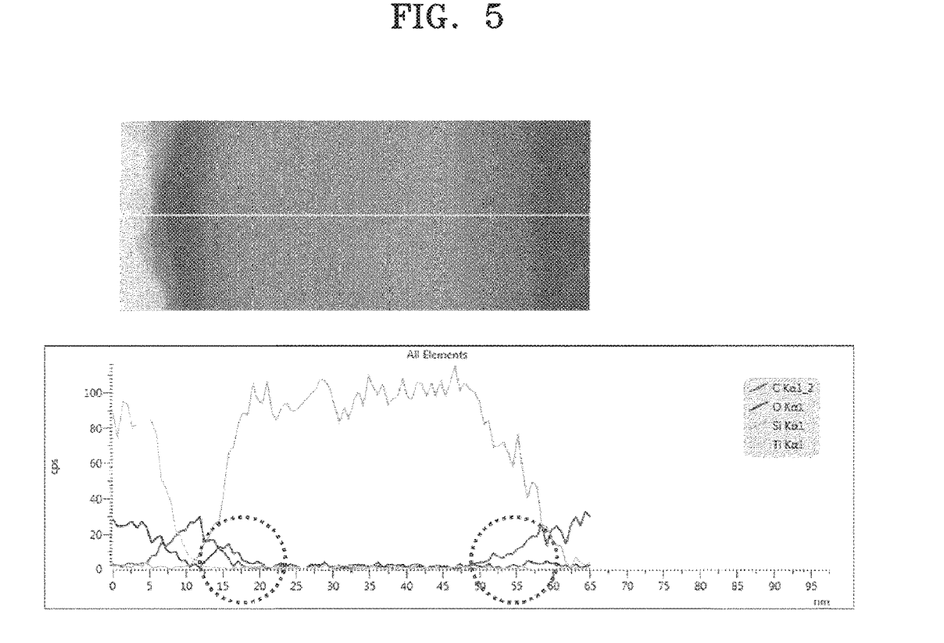
FIG. 5 shows the results of energy dispersive X-ray (EDX) line mapping.

FIG. 5 shows the results of energy dispersive X-ray (EDX) line mapping.

Referring to an element analysis graph of FIG. 5 (lower part), the presence of Ti, C, Si, and C was identified in the stated order from left to right, and there are C—Si mixed regions (two regions denoted by circles) at both edges of the Si region, the left one corresponding to the second carbon coating layer, the right one corresponding to the first carbon coating layer. It is assumed that the presence of the C—Si mixed regions is due to the increase specific surface area of the carbon (C) layer.

Figure 6:
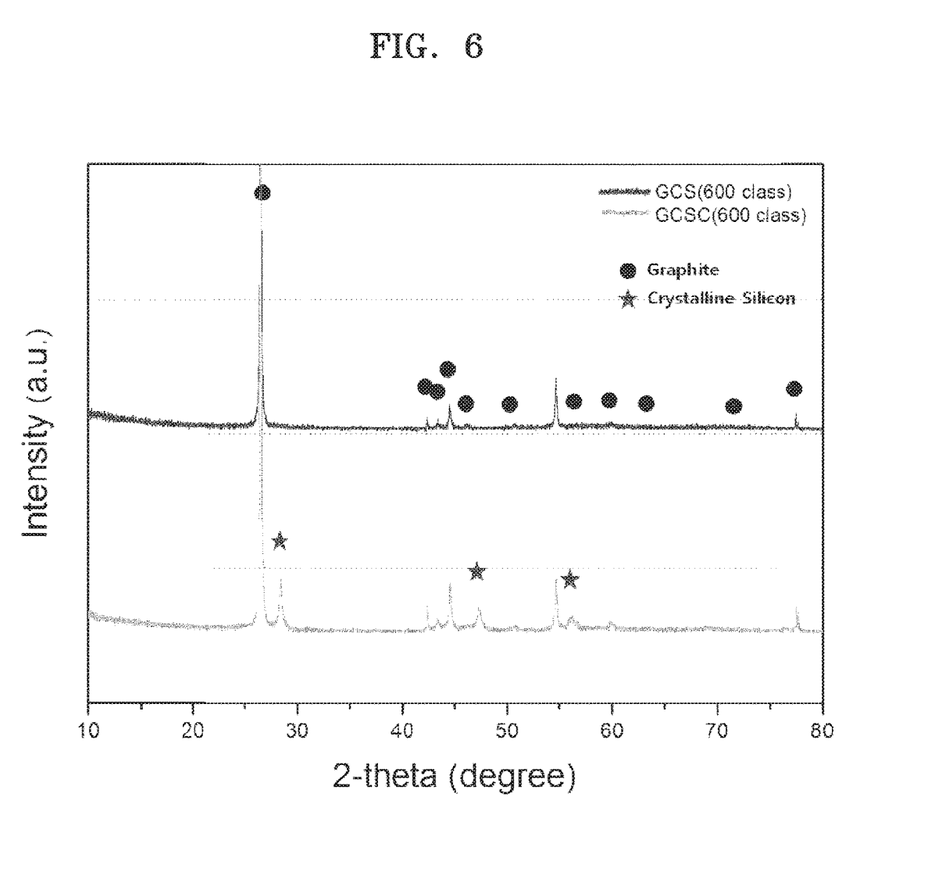
FIG. 6 shows the results of X-ray diffraction (XRD) analysis.

FIG. 6 shows the results of X-ray diffraction (XRD) analysis.

In FIG. 6, "GCS" denotes a sample having a structure of graphite (G)+first carbon coating layer (C)+silicon (S) having a capacity of about 600 mAh/g. Referring to FIG. 6, in the GCS sample, the intensities of only graphite peaks were detected, but not any peak of amorphous silicon (Si).

However, in a GCSC sample including the second carbon coating layer, silicon peaks were detected. This is attributed to that the amorphous silicon was partially changed into crystalline form during deposition of the second carbon coating layer at about 900° C.

That is, it was found that according to Example, silicon as deposited on first carbon coating layer was amorphous but changed into semicrystalline form during the formation of the second carbon coating layer.

Experimental Example 3: Analysis of Battery Data

Figure 7:
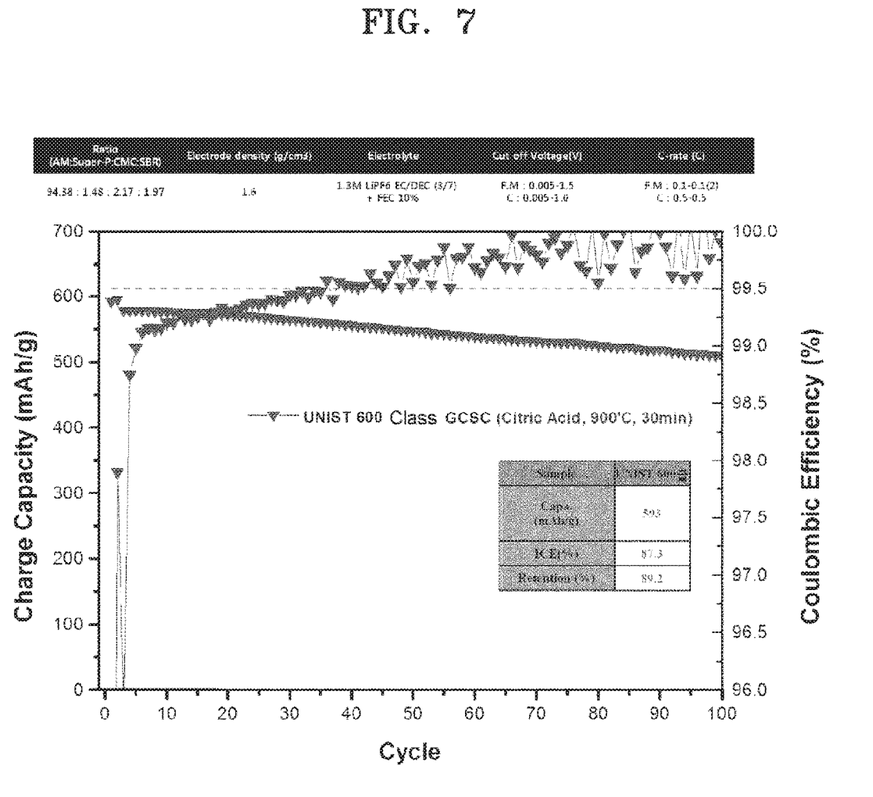
FIG. 7 is a graph showing lifetime characteristics and coulombic efficiency with respect to the number of cycles in a cell according to Example.

FIG. 7 is a graph showing lifetime characteristics and coulombic efficiency with respect to the number of cycles in a cell according to Example. The X-axis denotes the number of cycles, the Y-axis on the left denotes charge capacity, and the Y-axis on the right denotes coulombic efficiency. Referring to FIG. 7, the cell according to Example was found to have desired cell characteristics.

Figure 8:
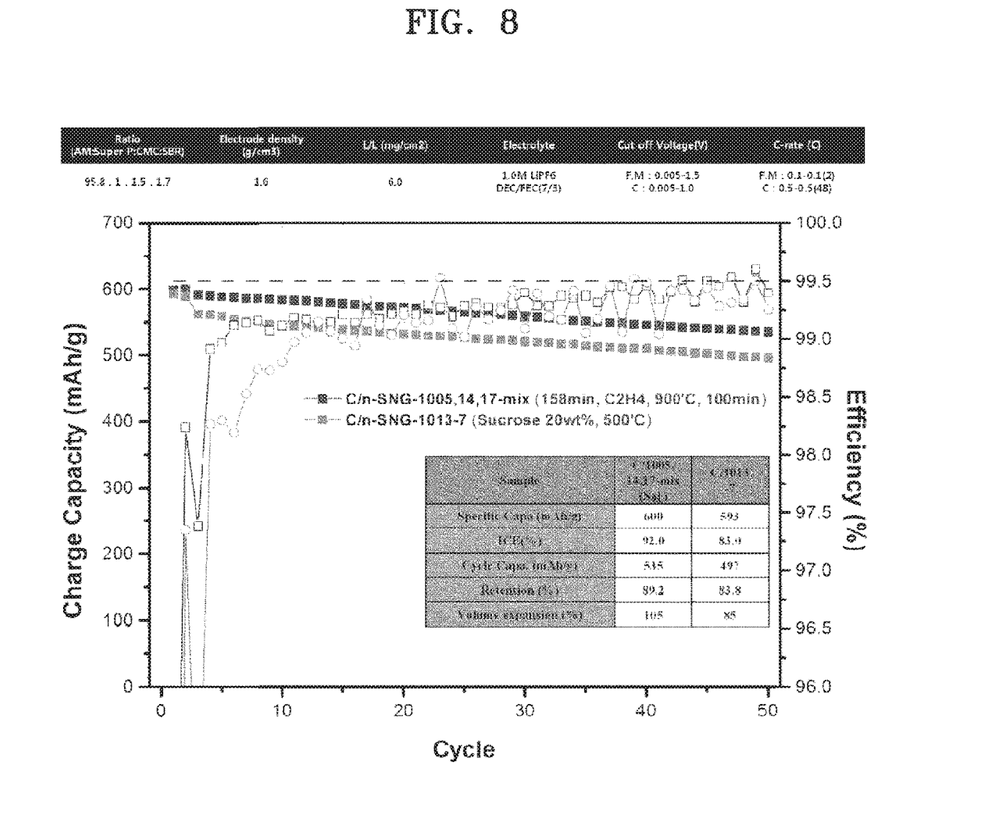
FIG. 8 shows evaluation data of capacity retention rate with respect to the number of cycles.

FIG. 8 shows evaluation data of capacity retention rate with respect to the number of cycles.

The table in FIG. 8 shows the levels of volume expansion (%) after 50 cycles relative to before the cycles, when the first carbon coating layer was or was not formed, wherein the levels of volume expansion were evaluated by measuring the thicknesses of an electrode plate taken from the cell before and after 50 cycles.

In FIG. 8, a graph in red denotes when the first carbon coating layer was not formed (Graphite+Si+Carbon, Comparative Example 2), and a graph in orange denotes when the first carbon coating layer was formed (Example).

Referring to the table in FIG. 8, the final material including the first carbon coating layer (Graphite+Carbon+Si+Carbon, Example) were found to have improved volume expansions characteristics by about 20%, compared to that of Comparative Example 2.

Figure 9:
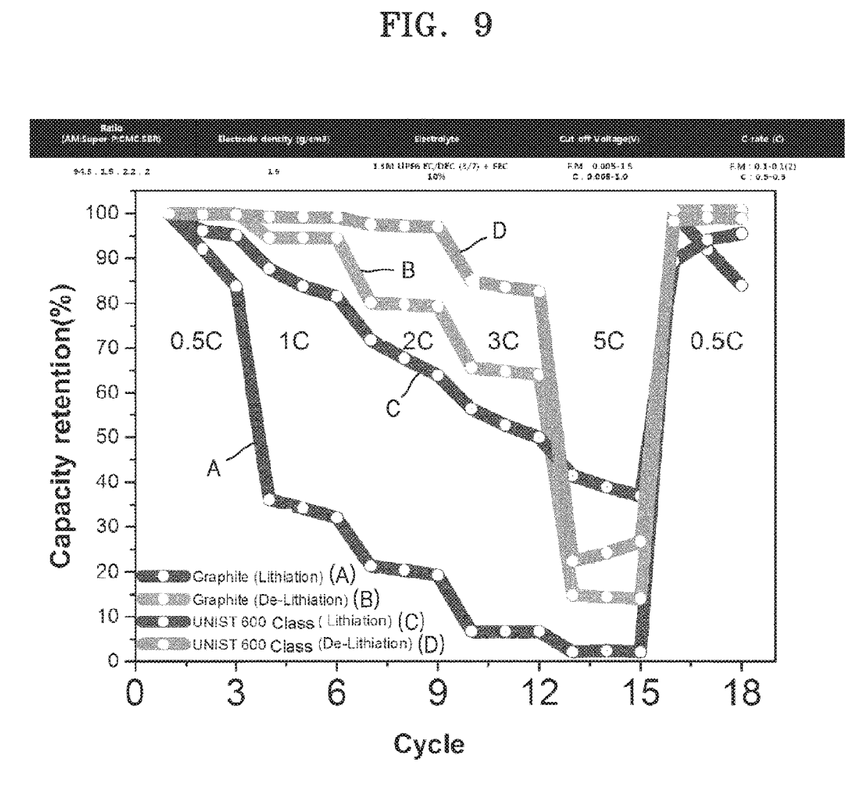
FIG. 9 shows evaluation data of rate characteristics.

FIG. 9 shows evaluation data of rate characteristics. In FIG. 9, "Graphite" denotes a sample of Comparative Example 1, "UNIST 600 class" denotes a sample of Example), "Lithiation" denotes high-rate charge characteristics at 0.5 C, 1 C. 2 C, 3 C, and 5 C, and "De-lithiation" denotes high-rate discharge characteristics at 0.5 C, 1 C, 2 C, 3 C, and 5 C.

In FIG. 9, the X-axis denotes the number of cycles, and the Y-axis denotes normalized capacity retention.

Graphite has a reversible capacity (i.e., non-theoretical actual capacity) of about 357 mAh/g as a result of normalization. The material of Example was found to have a reversible capacity of about 600 mAh/g. Based on these two initial reversible capacities (100%), a degree of capacity drop (%) with respect to the initial reversible capacity with increasing C-rates was evaluated. As a result, the cell of Example was found to have considerably improved battery characteristics.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

The invention claimed is:

1. An anode active material for a lithium secondary battery, comprising:
    carbon particles having a spherical shape;
    a first carbon coating layer present on surfaces of the carbon particles;
    a silicon coating layer present on the first carbon coating layer and including silicon nanoparticles; and
    a second carbon coating layer present on the silicon coating layer.

2. The anode active material of claim 1, wherein the carbon particles having the first carbon coating layer thereon have an about 10% or greater increased Brunauer-Emmett-Teller (BET) specific surface area with respect to a BET specific surface area of the carbon particles having the spherical shape.

3. The anode active material of claim 1, wherein the carbon particles having the first carbon coating layer thereon have an about 10% or greater decreased Brunauer-Emmett-Teller (BET) specific surface area with respect to a BET specific surface area of the carbon particles having the spherical shape.

4. The anode active material of claim 1, wherein the silicon nanoparticles are semicrystalline.

5. The anode active material of claim 1, wherein the first carbon coating layer partially includes a mixed layer of silicon and carbon.

6. The anode active material of claim 5, wherein the mixed layer of silicon and carbon layer has a concentration gradient in which an amount of silicon decreases in the direction of a core.

7. The anode active material of claim 1, wherein the silicon coating layer present on the first carbon coating layer is in a mixed form of a film and an island.

8. The anode active material of claim 1, wherein a content ratio of silicon to carbon is 3:97 to 20:80, with respect to a total weight of the anode active material.

9. The anode active material of claim 1, wherein the anode active material includes 2 wt % to 6 wt % of the first carbon coating layer, 4 wt % to 20 wt % of the silicon coating layer, and 1.5 wt % to 10 wt % of the second carbon coating layer, each based on a total of 100 wt % of the anode active material, and the remainder is the carbon particles.

10. The anode active material of claim 1, wherein the carbon particles comprise graphite, amorphous carbon, or a combination thereof.

11. The anode active material of claim 1, wherein the carbon particles have a particle diameter of 5 μm to 20 μm.

12. The anode active material of claim 1, wherein the first carbon coating layer has a thickness of 5 nm to 200 nm.

13. The anode active material of claim 1, wherein the silicon coating layer has a thickness of 20 nm to 60 nm.

14. The anode active material of claim 1, wherein the second carbon coating layer has a thickness of 5 nm to 200 nm.

15. A lithium secondary battery comprising:
    a cathode;
    an anode; and
    an electrolyte,
    wherein the anode comprises the anode active material of claim 1.

16. A method of preparing an anode active material for a lithium secondary battery, the method comprising:
    preparing carbon particles having a spherical shape;
    forming a first carbon coating layer on surfaces of the carbon particles;

forming, on the first carbon coating layer, a silicon coating layer including silicon nanoparticles; and forming a second carbon coating layer on the silicon coating layer.

17. The method of claim 16, wherein the forming of the first carbon coating layer on the surfaces of the carbon particles is performed using a sol-gel method.

18. The method of claim 16, wherein the forming of the first carbon coating layer on the surfaces of the carbon particles is performed using a chemical vapor deposition method.

19. The method of claim 16, wherein, in the forming of the silicon coating layer including silicon nanoparticles on the first carbon coating layer, the silicon nanoparticles are amorphous.

20. The method of claim 16, wherein, in the forming of the silicon coating layer including silicon nanoparticles on the first carbon coating layer, the silicon coating layer is deposited in a mixed form of a film and an island.

21. The method of claim 16, wherein the forming of the second carbon coating layer on the silicon coating layer is performed using a physical milling method, a sol-gel method, or a chemical vapor deposition method.

* * * * *